US011970674B2

(12) United States Patent
Park et al.

(10) Patent No.: US 11,970,674 B2
(45) Date of Patent: Apr. 30, 2024

(54) NON-WOVEN FABRIC FOR DRYER SHEET

(71) Applicant: KOLON INDUSTRIES, INC., Seoul (KR)

(72) Inventors: Young-shin Park, Seoul (KR); Min-ho Lee, Seoul (KR); Jung-soon Jang, Seoul (KR); Hee-jung Cho, Seoul (KR); Woo-seok Choi, Seoul (KR)

(73) Assignee: KOLON INDUSTRIES, INC., Seoul (KR)

(*) Notice: Subject to any disclaimer, the term of this patent is extended or adjusted under 35 U.S.C. 154(b) by 522 days.

(21) Appl. No.: 17/280,890

(22) PCT Filed: Dec. 19, 2019

(86) PCT No.: PCT/KR2019/018127

§ 371 (c)(1),
(2) Date: Mar. 28, 2021

(87) PCT Pub. No.: WO2020/130683

PCT Pub. Date: Jun. 25, 2020

(65) Prior Publication Data

US 2021/0403840 A1 Dec. 30, 2021

(30) Foreign Application Priority Data

Dec. 21, 2018 (KR) ........................ 10-2018-0167741

(51) Int. Cl.

| | |
|---|---|
| ***C11D 3/37*** | (2006.01) |
| ***C11D 17/04*** | (2006.01) |
| ***C11D 17/06*** | (2006.01) |
| ***D04H 3/011*** | (2012.01) |
| ***D04H 3/016*** | (2012.01) |
| ***D04H 3/018*** | (2012.01) |

(52) U.S. Cl.

CPC ............ *C11D 17/047* (2013.01); *C11D 17/06* (2013.01); *D04H 3/011* (2013.01); *D04H 3/016* (2013.01); *D04H 3/018* (2013.01); *D10B 2331/04* (2013.01)

(58) Field of Classification Search

CPC ...... C11D 3/3715; C11D 17/06; D04H 3/011; D04H 3/016; D04H 3/018

See application file for complete search history.

(56) References Cited

U.S. PATENT DOCUMENTS

| | | | | |
|---|---|---|---|---|
| 2014/0154943 | A1 * | 6/2014 | Choi | ...................... D04H 1/425 28/165 |
| 2014/0272359 | A1 | 9/2014 | Cheng | |
| 2017/0306538 | A1 | 10/2017 | Lee | |
| 2020/0040498 | A1 | 2/2020 | Cho et al. | |

FOREIGN PATENT DOCUMENTS

| | | | | |
|---|---|---|---|---|
| CN | 101939469 | A | 1/2011 | |
| CN | 102439221 | A | 5/2012 | |
| CN | 105839298 | A | 8/2016 | |
| JP | 2000220030 | A | 8/2000 | |
| JP | 2003306863 | A | 10/2003 | |
| JP | 6185140 | B | 6/2016 | |
| JP | 2017128821 | A | 7/2017 | |
| KR | 101998-0080101 | A | 11/1998 | |
| KR | 1020040105931 | A | 12/2004 | |
| KR | 1020050047793 | A | 5/2005 | |
| KR | 1020050047793 | * | 5/2008 | ............... D04H 3/12 |
| KR | 1020130035414 | A | 4/2013 | |
| KR | 1020140042379 | A | 4/2014 | |
| KR | 1020150011129 | A | 1/2015 | |
| KR | 1020180035962 | A | 4/2018 | |
| KR | 1020180111148 | A | 10/2018 | |
| WO | 2018182177 | A1 | 10/2018 | |
| WO | 2019245216 | A1 | 12/2019 | |

OTHER PUBLICATIONS

CN Office Action dated May 25, 2022.
European Search Report dated May 10, 2022.
International Search Report dated Apr. 13, 2020.

* cited by examiner

*Primary Examiner* — Brian P Mruk
(74) *Attorney, Agent, or Firm* — Harvest IP Law, LLP

(57) ABSTRACT

The present disclosure relates to a method for preparing a non-woven fabric which improves impregnation and release properties of a fabric softener in the non-woven fabric in order to apply the non-woven fabric to a dryer sheet (sheet-type fabric softener). When increasing porosity and specific surface area in a non-woven fabric made of two-component blended polyester long fibers, impregnation and release rate of a fabric softener are improved even when the non-woven fabric is lightened, making it possible to apply the non-woven fabric to a dryer sheet.

10 Claims, No Drawings

NON-WOVEN FABRIC FOR DRYER SHEET

CROSS REFERENCE TO RELATED APPLICATIONS

This application is a National Stage of International Application No. PCT/KR2019/018127 filed Dec. 19, 2019, claiming priority based on Korean Patent Application No. 10-2018-0167741 filed Dec. 21, 2018.

TECHNICAL FIELD

The present disclosure relates to a method for preparing a non-woven fabric which improves impregnation and release properties of a fabric softener in the non-woven fabric in order to apply the non-woven fabric to a dryer sheet (sheet-type fabric softener).

BACKGROUND OF ART

A dryer sheet is a sheet-type fabric softener, and is added together with the dehydrated laundry in the drying step after washing, thereby imparting flexibility, antistatic properties, and fragrance properties to laundry.

In general, the fabric softener for a dryer sheet is characterized in that it is liquefied under heating conditions and is coated on a non-woven web through a gravure roll to be solidified at room temperature. Accordingly, in the process of preparing the dryer sheet, evenness, abrasion resistance, and an impregnation amount of the fabric softener of the non-woven fabric are important factors.

With respect to the first-generation dryer sheet, a cellulose-based non-woven fabric web was used in consideration of heat resistance and abrasion resistance, and this dryer sheet is prepared by wet-laid techniques, thereby having a dense structure. However, this has a disadvantage in that impregnation and release properties of the fabric softener are reduced.

With respect to the second-generation dryer sheet, a polyester-based short-fiber non-woven fabric web was used to improve the impregnation and release properties of the fabric softener. However, there are problems of low productivity due to a complicated manufacturing process, difficulty in manufacturing a low-weight non-woven fabric, and a decrease in abrasion resistance.

With respect to the third-generation dryer sheet, a long-fiber non-woven fabric web was applied to complement productivity and abrasion resistance of the polyester short-fiber non-woven fabric web. However, there is a disadvantage of contaminating laundry due to fuzz-generation by yarn breakages in the non-woven fabric web.

Meanwhile, everyday consumer goods makers attempt to continuously reduce manufacturing costs in order to increase the demand for products in the market.

Consequently, even in the dryer sheet, the weight of the non-woven fabric tends to be reduced from about 30 gsm to about 20 gsm or less. However, the reduction in specific surface area and the increase in density deviation due to the reduction in the weight of the non-woven fabric lead to a problem of deteriorating the impregnation and release properties of the fabric softener.

PRIOR ART DOCUMENTS

Patent Documents (Patent Document 1) Republic of Korea Patent Publication No. 2004-0105931 (Long-fiber non-woven fabric for dryer sheet and preparation method thereof).

DETAILED DESCRIPTION OF THE INVENTION

Technical Problem

In order to solve the above problems, there is provided a method for preparing a non-woven fabric exhibiting excellent impregnation and release properties of a fabric softener even when the non-woven fabric is made lightweight.

Technical Solution

In order to solve the above problems, there is provided a non-woven fabric for a dryer sheet, which is a blended long-fiber non-woven fabric including 70 wt % or more and 90 wt % or less of a first polyester filament having a melting point of 250° C. or higher and 10 wt % or more and 30 wt % or less of a second polyester filament having a melting point of 235° C. or lower, wherein the first filament has a deformed cross section with a degree of deformity (diameter of circumscribed circle/diameter of inscribed circle) of 2.5 or more and 3.0 or less, and a fineness of 5 denier or more and 10 denier or less.

In addition, there is provided a dryer sheet including the non-woven fabric for a dryer sheet.

Advantageous Effects

According to the present disclosure, impregnation and release properties of a fabric softener in a non-woven fabric for a dryer sheet are improved when increasing specific surface area and porosity by controlling a fineness and a degree of deformity in a non-woven fabric made of two-component blended polyester long fibers.

The dryer sheet according to the present disclosure can reduce the weight of the non-woven fabric for a dryer sheet by an increased amount of impregnation, thereby reducing manufacturing costs. Further, since flexibility of the fiber is improved by an increased amount of release of the fabric softener in a hot air dryer, it becomes possible to improve a softening efficiency even with a small amount of use.

DETAILED DESCRIPTION OF THE EMBODIMENTS

In the present disclosure, there are provided a non-woven fabric for a dryer sheet having excellent impregnation and release properties of a fabric softener by controlling a structure of the non-woven fabric through adjusting fineness and cross-sectional shape of long fibers, thereby increasing porosity and specific surface area in the long-fiber non-woven fabric prepared using two kinds of polyester-based materials with different melting points, and a method for preparing the same.

The non-woven fabric for a dryer sheet of the present disclosure is a blended long-fiber non-woven fabric including 70 wt % or more and 90 wt % or less of a first polyester filament having a melting point of 250° C. or higher and 10 wt % or more and 30 wt % or less of a second polyester filament having a melting point of 235° C. or lower, wherein the first filament has a deformed cross section with a degree of deformity (diameter of circumscribed circle/diameter of inscribed circle) of 2.5 or more and 3.0 or less, and a fineness of 5 denier or more and 10 denier or less.

The method of preparing the non-woven fabric for a dryer sheet of the present disclosure starts from a step of preparing a blended yarn by blend-spinning 70 wt % or more and 90 wt % or less of a first polyester filament having a melting point of 250° C. or higher and 10 wt % or more and 30 wt % or less of a second polyester filament having a melting point of 235° C. or lower such that the first filament has a deformed cross section and a fineness of 5 to 10 denier.

The first filament may be polyester having a melting point of 250° C. or higher, 250° C. or higher and 300° C. or lower, 250° C. or higher and 280° C. or lower, or 250° C. or higher and 260° C. or lower, and the second filament may be polyester having a melting point of 235° C. or lower, 200° C. or higher and 235° C. or lower, 200° C. or higher and 220° C. or lower, or 205° C. or higher and 215° C. or lower.

In addition, the non-woven fabric for a dryer sheet may include the first filament in an amount of 70 wt % or more and 90 wt % or less, 80 wt % or more and 90 wt % or less, or 83 wt % or more and 87 wt % or less, and the second filament in an amount of 10 wt % or more and 30 wt % or less, 10 wt % or more and 20 wt % or less, or 13 wt % or more and 27 wt % or less.

When the content ratio of the second filament is less than 10 wt %, fuzz and delamination may occur in the non-woven fabric by tumbling inside the dryer due to insufficient bonding force between the filaments. This may cause damages or contamination of laundry.

When the content ratio of the second filament exceeds 30 wt %, the filaments may aggregate due to insufficient cooling of the filaments during blend-spinning. Consequently, a large deviation in weight and density appears in the non-woven fabric, and an impregnation amount and a release rate of a fabric softener may decrease or become uneven.

In addition, a weight ratio of the first filament to the second filament may be 3:1 to 10:1, 3:1 to 8:1, 5:1 to 8:1, or 5:1 to 6:1.

Meanwhile, the first filament may have a deformed cross section such as a Y-shaped, cross-shaped (+-shaped), or star-shaped (☆-shaped) cross section, and may preferably have a Y-shaped deformed cross-section.

Meanwhile, the first filament may have a deformed cross section such as a circular, Y-shaped, cross-shaped (+-shaped), or star-shaped (☆-shaped) cross section, and may preferably have a circular deformed cross-section.

The shape of the deformed cross section and the degree of deformity (diameter of circumscribed circle/diameter of inscribed circle) can be controlled by adjusting capillary holes of the spinneret.

It is preferable that the degree of deformity of the first filament is 2.5 or more and 3.0 or less. When it is less than 2.0, an increase in the specific surface area of the non-woven fabric is insignificant. When it exceeds 3.0, since an internal pressure of the spinneret increases during spinning, the melt for forming filaments may leak, thereby causing defects in spinning and in the formation of a non-woven fabric.

The degree of deformity can be calculated by Equation 1 below.

The degree of deformity=diameter of circumscribed circle/diameter of inscribed circle [Equation 1]

The degree of deformity can be calculated after photographing the deformed cross-sectional structure of the filament using an optical microscope.

For example, when the first filament has a Y-shaped deformed cross section, the inscribed circle means a circle inscribed to all sides of a polygon, and the circumscribed circle means a circle passing through all vertices of a polygon and surrounding it.

In addition, the diameters of the circumscribed circle and the inscribed circle can be measured using an image analysis software for a deformed cross-sectional structure photographed using an optical microscope.

Specifically, the first filament may have a diameter of a circumscribed circle of 25 μm or more and 45 μm or less, 25 μm or more and 42 μm or less, or 29 μm or more and 42 μm or less. In addition, the first filament may have a diameter of an inscribed circle of 5 μm or more and 20 μm or less, 10 μm or more and 20 μm or less, or 10 μm or more and 17 μm or less.

Meanwhile, the first filament may have a fineness of 5 denier or more and 10 denier or less.

The fineness may be a fineness measured using the ASTM D1577 method.

When the fineness of the first filament is less than 5 denier, spinning workability may be deteriorated due to a lot of yarn breakages, or the melt for filament may cause a die-swell phenomenon, making it difficult to uniformly form a deformed cross section. When it exceeds 10 denier, phase transition of the melt for filament may be delayed due to insufficient cooling, and thus agglomeration of the filament may occur.

In addition, the first filament may have a surface temperature of 50° C. or less. The surface temperature may be a surface temperature value measured using a thermal imaging camera. Since the surface temperature of the first filament is 50° C. or less, the first filament may have excellent spinnability in accordance with the management standard for yarn breakages.

Meanwhile, the second filament may have a fineness of 1 denier or more and 5 denier or less, 1 denier or more and 3 denier or less, or 3 denier.

Accordingly, a fineness ratio of the first filament to the second filament may be 1.5:1 to 5:1, 1.6:1 to 5:1, or 1.5:1 to 4:1.

In addition, the second filament may have a deformed cross-section having the degree of deformity (diameter of circumscribed circle/diameter of inscribed circle) of 0.5 or more and 1.5 or less, 0.5 or more and 1.0 or less, or 1.0.

Accordingly, a deformity ratio of the first filament to the second filament may be 1.5:1 to 5:1, 2:1 to 5:1, 2:1 to 3:1, or 2.5:1 to 3:1.

In addition, a melting point ratio of the first filament to the second filament may be 1.1:1 to 5:1, 1.1:1 to 5:1, 1.1:1 to 3:1, 1.1:1 to 2:1, or 1.2:1 to 2:1.

In the step of preparing the blended yarn, the filament in which two-component polyesters are spun in the form of blended yarn can be sufficiently drawn at a drawing speed of 4,500 to 5,500 m/min in using a high-pressure air drawing device.

At this time, when the drawing speed is less than 4,500 m/min, the degree of crystallinity of the filament is low, thereby lowering strength of the non-woven fabric, and when the drawing speed exceeds 5,500 m/min, the filaments are slipped by drawing air, which may cause entanglement with adjacent filaments and may degrade evenness of the non-woven fabric.

Subsequently, a step of forming a web by laminating the blended yarn is performed.

At this time, the web is formed by laminating the blended yarn on a continuously moving conveyor net by a conventional method.

Subsequently, a step of adjusting a thickness in a calendering process of passing the web through a calendering roller is performed to prepare a non-woven fabric having a porosity of 88 to 95% and a specific surface area of 0.10 to 0.18 $m^2$/g.

The porosity and specific surface area may be measured using the ASTM F316 method.

At this time, a calendering process of passing the web between calender rolls which are heated to 140 to 160° C. and have a gap by a conventional manner and then treating the web with hot air is performed to give the non-woven fabric a thickness and smoothness for an appropriate porosity, thereby adjusting the structure of the non-woven fabric.

The calender roller may include an embossing roll, and the embossing roll has a pattern ratio of 10 to 30%.

The porosity of the non-woven fabric can be adjusted by adjusting the thickness of the non-woven fabric in the calendering process.

Since the non-woven fabric prepared by the above method has the increased porosity and specific surface area by controlling the shape and fineness of constituting filaments and the thickness of the non-woven fabric web, it is possible to have excellent impregnation and release properties of a fabric softener and have cost competitiveness due to weight reduction when applied to a dryer sheet.

Specifically, the non-woven fabric for a dryer sheet according to claim 1 may have 3 defects/$m^2$ or less, or 1 defect/$m^2$ or more and 2 defects/$m^2$ or less. Specifically, the number of defects can be determined by the naked eye.

In addition, the non-woven fabric for a dryer sheet of the embodiment may have a thickness measured according to ASTM D1777 of 0.15 mm or more and 0.25 mm or less.

According to another embodiment of the present disclosure, there may be provided a dryer sheet including the non-woven fabric for a dryer sheet of the embodiment.

Specifically, the dryer sheet may be made of the above non-woven fabric for a dryer sheet, wherein an impregnation amount of a fabric softener may be 40 g/$m^2$ or more and 55 g/$m^2$ or less, and a release rate may be 90%/hour or more and 99%/hour or less.

The impregnation amount of the fabric softener can be measured using the ASTM D461 method.

In addition, the release rate may be calculated by a difference between an initial impregnation amount and a residual amount of the fabric softener after 60 minutes while drying the sample impregnated with the fabric softener under hot air conditions.

As the release rate is 90%/hour or more, the performance of the dryer sheet may be excellent.

Hereinafter, the present disclosure will be described in more detail based on the following Examples and Comparative Examples.

However, the following Examples are for illustrative purposes only, and the present disclosure is not limited by the Examples. It will be apparent to those skilled in the art that substitution or modification can be made to equivalent other examples within a range not departing from the technical spirit of the present disclosure.

Example 1

Polyethylene terephthalate (PET) having a melting point of 255° C. as a first filament, and copolymerized polyester (CoPET) having a melting point of 210° C. as a second filament were melted at a spinning temperature of 285° C. using a continuous extruder, and then discharged through capillary holes of a spinneret. Then, the discharged continuous filaments were solidified with cooling air, and drawn at a spinning speed of 5,000 m/m in using a high-pressure air drawing device to obtain filament fibers.

At this time, blend-spinning was performed such that the content ratio of the first filament and the second filament was 85 wt %: 15 wt %. Herein, a discharge amount and a shape and the number of capillary holes of the spinneret were adjusted so that the first filament had a Y-shaped cross section with the fineness and the degree of cross-sectional deformity as shown in Table 1, and the second filament had a circular cross-section with the fineness of 3 denier (the degree of cross-sectional deformity is 1).

Subsequently, the filament fibers were laminated in the form of a web on a conveyor net at a weight of 18 g/$m^2$ per unit area, and then subjected to a calendering process of passing the filament fibers between calender rolls in a conventional manner to prepare a spunbond non-woven fabric.

Examples 2 to 3

A spunbond non-woven fabric was prepared in the same manner as in Example 1, except that the fineness and the degree of cross-sectional deformity of the first filament were changed as shown in Table 1 below.

Comparative Example 1

A spunbond non-woven fabric was prepared in the same manner as in Example 1, except that the fineness and the degree of cross-sectional deformity of the first filament were changed as shown in Table 1 below.

Comparative Example 2

A spunbond non-woven fabric was prepared in the same manner as in Example 1 and Table 1 below, except that the first filament was made to have the degree of cross-sectional deformity of 2.5 in order to control the specific surface area and porosity of the non-woven fabric. As the fineness of the first filament was adjusted, a die-swell phenomenon occurred and the target degree of deformity (2.5) was not formed.

Comparative Example 3

A spunbond non-woven fabric was prepared in the same manner as in Example 1 and Table 1 below, except that the first filament was made to have the degree of cross-sectional deformity of 3.0 in order to control the specific surface area and porosity of the non-woven fabric. As the fineness of the first filament was adjusted, a die-swell phenomenon occurred and the target degree of deformity (3.0) was not formed.

Comparative Example 4

A spunbond non-woven fabric was prepared in the same manner as in Example 1, except that the fineness and the degree of cross-sectional deformity of the first filament were changed as shown in Table 1 below.

Comparative Example 5

A spunbond non-woven fabric was prepared in the same manner as in Example 1 and Table 1 below, except that the first filament was made to have the degree of cross-sectional deformity of 2.5 in order to control the specific surface area and porosity of the non-woven fabric. As the fineness of the first filament was adjusted, a die-swell phenomenon occurred and the target degree of deformity (2.5) was not formed.

Comparative Example 6

A spunbond non-woven fabric was prepared in the same manner as in Example 1 and Table 1 below, except that the first filament was made to have the degree of cross-sectional deformity of 3.0 in order to control the specific surface area and porosity of the non-woven fabric. As the fineness of the first filament was adjusted, a die-swell phenomenon occurred and the target degree of deformity (3.0) was not formed.

The properties of the non-woven fabrics of Examples and Comparative Examples were measured using the following test methods, and the results are shown in Table 2 below.

<Test Method>

1. Fineness of Filament (Denier)

The fineness of the filament was measured using the ASTM D1577 method.

The fineness of the filament was measured using VIBRO-SKOP measuring device from Lenzing, and the results of 10 measurements were averaged and shown.

2. Degree of Deformity

The cross-sectional structure of the filament was observed using an optical microscope (LV100ND, manufactured by Nikon).

The degree of deformity is defined as a diameter ratio of a circumscribed circle and an inscribed circle.

Sampling was performed randomly in the width direction, and the results of 10 measurements were averaged and shown.

3. Surface Temperature of Filament (° C.)

The surface temperature of the filament was measured using a thermal imaging camera (Ti32, manufactured by FLUKE), and the results of 10 measurements were averaged and shown.

4. Thickness of Non-Woven Fabric (Mm)

The thickness of the non-woven fabric was measured using the ASTM D1777 method.

The results obtained by measuring 10 times/m in the width direction using a thickness measuring device from Mitutoyo were averaged and shown.

5. Porosity (%) and Specific Surface Area ($m^2/g$) of Non-Woven Fabric

They were measured using the ASTM F316 method.

A fluid having a viscosity of 0.019 cP passed through a specimen having a diameter of 2 cm fixed to a measuring part in ESA measuring device from Porous Materials Inc. At this time, the porosity and specific surface area of the specimen were measured by the flow rate according to the pressure.

6. Impregnation Amount ($g/m^2$) of Fabric Softener

It was measured using the ASTM D461 method.

Measurement was performed by immersing a specimen having a size of 20×20 cm (width×length) in a water bath containing a fabric softener, and standardizing the difference in weight before and after immersion with the weight of the non-woven fabric.

7. Release Rate (%) of Fabric Softener

A towel weighing 110±5 gsm was washed and dehydrated to prepare a towel weighing 200±5 gsm.

10 sheets of the prepared towels and 1 sheet of fabric softener-impregnated specimen (width×length=20×20 cm) were dried under hot air conditions of 65 to 70° C. for 1 hour.

The release behavior was obtained by measuring a change in weight of the towel at intervals of 20 minutes, and the release rate was calculated by a difference between the impregnation amount and a residual amount of the fabric softener after 60 minutes.

TABLE 1

| | First filament | | | | | |
|---|---|---|---|---|---|---|
| Category | Fineness (De) | Outer diameter (μm) | Inner diameter (μm) | Degree of deformity | Surface temp. (° C.) | Spinnability * |
| Example 1 | 5.0 | 29.35 | 11.79 | 2.5 | 48.0 | ○ |
| Example 2 | 5.0 | 31.86 | 10.80 | 3.0 | 47.9 | ○ |
| Example 3 | 10.0 | 41.51 | 16.41 | 2.5 | 49.7 | ○ |
| Comparative Example 1 | 2.5 | 15.96 | — | 1.0 | 46.6 | ○ |
| Comparative Example 2 | 2.5 | 17.59 | 10.35 | 1.7 | 46.4 | ○ |
| Comparative Example 3 | 2.5 | 18.43 | 9.70 | 1.9 | 48.3 | ○ |
| Comparative Example 4 | 5.0 | 20.61 | — | 1.0 | 48.2 | ○ |
| Comparative Example 5 | 10.0 | 32.04 | — | 1.0 | 54.6 | x |
| Comparative Example 6 | 12.0 | 43.88 | 19.05 | 2.3 | 51.8 | x |

* Spinnability is evaluated based on the surface temperature of 50° C. in accordance with the management standard for yarn breakages (2 times/day).

In Comparative Examples 2 and 3, a die-swell phenomenon occurred, and thus the target degree of deformity (2.5) was not formed In Comparative Example 6, a die-swell phenomenon occurred, and thus the target degree of deformity (3.0) was not formed. In addition, yarn breakages or defects occurred in the yarn by molten foreign matter during spinning.

TABLE 2

| Category | Non-woven fabric Thickness (mm) | Porosity (%) | Specific surface area ($m^2/g$) | The number of defects (defect s/$m^2$) | Visual observation* | Non-woven fabric containing fabric softener Impregnation amount ($g/m^2$) | Release rate (%/Hr) | Performance evaluation ** |
|---|---|---|---|---|---|---|---|---|
| Example 1 | 0.164 | 88.9 | 0.154 | 1 | ○ | 44.7 | 94 | ○ |
| Example 2 | 0.178 | 90.1 | 0.168 | 1 | ○ | 50.5 | 97 | ○ |
| Example 3 | 0.232 | 91.6 | 0.107 | 2 | ○ | 42.5 | 97 | ○ |
| Comparative Example 1 | 0.091 | 79.7 | 0.156 | 1 | ○ | 45.3 | 81 | ○ |
| Comparative Example 2 | 0.099 | 81.7 | 0.185 | 4 | x | 46.3 | 73 | x |
| Comparative Example 3 | 0.103 | 82.5 | 0.193 | 6 | x | 47.6 | 73 | x |
| Comparative Example 4 | 0.127 | 85.3 | 0.112 | 2 | ○ | 33.7 | 91 | ○ |
| Comparative Example 5 | 0.181 | 90.0 | 0.078 | 10 | x | 32.4 | 90 | ○ |
| Comparative Example 6 | 0.224 | 91.9 | 0.104 | 7 | x | 33.1 | 95 | ○ |

*Visual observation is determined from the number of defects identified with the naked eye in accordance with the quality standard (3 defects/$m^2$ or less).
** In the performance evaluation, 90%/Hr or more of the release rate of a fabric softener is evaluated to have good performance.

From the results of Table 2, it was confirmed that the non-woven fabrics of Examples having the porosity and specific surface area according to the present disclosure exhibited excellent performance in both the impregnation amount and the release rate compared to the non-woven fabrics of Comparative Examples.

In addition, it can be seen from the comparison between Examples and Comparative Examples 1, 4 and 5 that it is easier to use the yarn having a deformed cross-section for the first filament constituting the non-woven fabric in order for the non-woven fabric to have the porosity and specific surface area of the present disclosure.

Meanwhile, it was confirmed from Comparative Examples 2, 3 and 6 that when the fineness of the yarn having the deformed cross-section constituting the non-woven fabric was too low or too high, spinnability was deteriorated and thus it was difficult to obtain a desired degree of deformity. As a result, it can be seen that the performance of the non-woven fabric containing a fabric softener is deteriorated because it is difficult to simultaneously improve the porosity and the specific surface area in the non-woven fabric.

The invention claimed is:

1. A non-woven fabric for a dryer sheet, which is a blended long-fiber non-woven fabric comprising 70 wt % or more and 90 wt % or less of a first polyester filament having a melting point of 250° C. or higher and 10 wt % or more and 30 wt % or less of a second polyester filament having a melting point of 235° C. or lower, wherein the first filament has a deformed cross section with a degree of deformity of 2.5 or more and 3.0 or less, and a fineness of 5 denier or more and 10 denier or less, wherein the degree of deformity is calculated by Equation 1 below:

$$\text{the degree of deformity} = \frac{\text{a diameter of circumscribed circle}}{\text{a diameter of inscribed circle}}, \quad \text{[Equation 1]}$$

wherein the non-woven fabric for a dryer sheet has 3 defects/$m^2$ or less, wherein the blended long-fiber non-woven fabric has a porosity of 88% or more and 95% or less and a s surface area of 0.10 $m^2/g$ or more sand 0.18 $m^2/g$ or less.

2. The non-woven fabric for a dryer sheet of claim 1, wherein the deformed cross-section is any one selected from Y-shaped, cross-shaped and star-shaped.

3. The non-woven fabric for a dryer sheet of claim 1, wherein the second filament has a fineness of 1 denier or more and 5 denier or less.

4. The non-woven fabric for a dryer sheet of claim 1, wherein the second filament has a deformed cross section having the degree of deformity of 0.5 or more and 1.5 or less.

5. The non-woven fabric for a dryer sheet of claim 1, wherein a fineness ratio of the first filament to the second filament is 1.5:1 to 5:1.

6. The non-woven fabric for a dryer sheet of claim 1, wherein a deformity ratio of the first filament to the second filament is 1.5:1 to 5:1.

7. The non-woven fabric for a dryer sheet of claim 1, wherein a weight ratio of the first filament to the second filament is 3:1 to 10:1.

8. The non-woven fabric for a dryer sheet of claim 1, wherein a melting point ratio of the first filament to the second filament is 1.1:1 to 5:1.

9. A dryer sheet comprising the non-woven fabric for a dryer sheet according to claim 1.

10. The dryer sheet of claim 9, wherein an impregnation amount of a fabric softener is 40 $g/m^2$ or more and 55 $g/m^2$ or less, and a release rate is 90%/hour or more and 99%/hour or less.

* * * * *